United States Patent
Yaoyama (10) Patent No.: US 8,284,415 B2
(45) Date of Patent: Oct. 9, 2012

(54) IMAGE FORMING APPARATUS, HARDWARE SELF-DIAGNOSING METHOD, AND HARDWARE SELF-DIAGNOSING PROGRAM

(75) Inventor: Takahiro Yaoyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 900 days.

(21) Appl. No.: 12/390,625

(22) Filed: Feb. 23, 2009

(65) Prior Publication Data
US 2009/0219560 A1    Sep. 3, 2009

(30) Foreign Application Priority Data
Feb. 28, 2008 (JP) .................... 2008-048779

(51) Int. Cl.
*G06F 15/00* (2006.01)
*G06F 3/12* (2006.01)
*G06K 1/00* (2006.01)
*G06K 15/00* (2006.01)

(52) U.S. Cl. ...................... 358/1.13; 358/1.14

(58) Field of Classification Search ........... None
See application file for complete search history.

(56) References Cited

U.S. PATENT DOCUMENTS
2005/0182751 A1* 8/2005 Kitamura et al. ........... 707/1
2009/0299676 A1* 12/2009 Fujiwara .................... 702/114

FOREIGN PATENT DOCUMENTS
| JP | 5-88931 | 4/1993 |
| JP | 6-119256 | 4/1994 |
| JP | 7-312665 | 11/1995 |
| JP | 2002-63048 | 2/2002 |
| JP | 2007-316265 | 12/2007 |

\* cited by examiner

*Primary Examiner* — Douglas Tran
(74) *Attorney, Agent, or Firm* — Oblon, Spivak, McClelland, Maier & Neustadt, L.L.P.

(57) ABSTRACT

A hardware self-diagnosing method for performing a hardware self-diagnosis of an image forming apparatus includes reading a set value stored in a memory unit of the image forming apparatus; performing the hardware self-diagnosis of the image forming apparatus in a detailed diagnosis mode at intervals determined by the set value stored in the memory unit; and performing the hardware self-diagnosis of the image forming apparatus in a simplified diagnosis mode in between the intervals at which the hardware self-diagnosis is performed in the detailed diagnosis mode. The set value may be a period of time or a number of recording media outputted by the image forming apparatus.

20 Claims, 7 Drawing Sheets

IMAGE FORMING APPARATUS, HARDWARE SELF-DIAGNOSING METHOD, AND HARDWARE SELF-DIAGNOSING PROGRAM

BACKGROUND OF THE INVENTION

1. Field of the Invention

The present invention generally relates to image forming apparatuses such as digital copy machines, multifunction peripherals, and printers, in which a hardware self-diagnosis is implemented. The present invention also relates to hardware self-diagnosing methods and programs.

2. Description of the Related Art

In recent years, self-diagnosing techniques are gaining attention as part of maintenance work to prevent apparatus failure. Japanese Laid-Open Patent Application No. 2002-63048 discloses a technique for performing a maintenance process, such as self-diagnosis, on an apparatus quickly at low cost, without requiring the dispatch of an installation technician or a field support technician to the location of the installed apparatus.

Japanese Laid-Open Patent Application No. 7-312665 discloses a self-diagnosis technique whereby a prerecorded address is notified about a result of self-diagnosis via telephone lines or the like, thus enabling the external notification of an accurate self-diagnosis result or error content.

Japanese Laid-Open Patent Application No. 2007-316265 discloses a technique whereby an image forming apparatus that has failed to make an error report is prompted by a command from a remote management apparatus to perform self-diagnosis, wherein the remote management apparatus is notified about a self-diagnosis result. The technique thus allows the image forming apparatus to be maintained before any fatal failure develops in the apparatus, without periodically dispatching a field support technician to the installed location of the apparatus.

While these publications discuss various self-diagnosis techniques for preventing an apparatus failure, if a self-diagnosis is performed each time the main power to the apparatus is turned on, this slows down the starting up of the apparatus and extends the time before a user can operate the apparatus. However, there is actually no need to implement the hardware self-diagnosis on a control unit each time the main power is turned on. This is because it is only necessary to detect a possible device failure due to aging, and reliability can be ensured by implementing the self-diagnosis at certain predetermined intervals.

There is also the demand for reduced startup time following the turning on of main power to an image forming apparatus, with a resultant need to reduce the time for hardware self-diagnosis on the controller unit. On the other hand, there is also the need to perform a detailed diagnosis to detect a hardware failure and the like caused by an accident, use environment, or aging with improved accuracy so that a repair or replacement can be smoothly implemented as needed.

SUMMARY OF THE INVENTION

It is a general object of the present invention to provide an image forming apparatus, a hardware self-diagnosing method, and a hardware self-diagnosing program whereby one or more of the aforementioned problems of the related art are eliminated.

A more specific object of the present invention is to provide an image forming apparatus having a hardware self-diagnosing unit, a hardware self-diagnosing method for such an image forming apparatus, and a hardware self-diagnosing program whereby the startup time before a user can operate the apparatus following the turning-on of main power to the apparatus can be reduced while a hardware self-diagnosis is implemented.

According to one aspect of the present invention, an image forming apparatus includes a hardware self-diagnosing unit having a simplified diagnosis mode and a detailed diagnosis mode and being configured to perform a hardware self-diagnosis of the image forming apparatus, and a memory unit configured to store a set value for implementing the hardware self-diagnosis in the detailed diagnosis mode. The hardware self-diagnosis unit performs the hardware self-diagnosis in the detailed diagnosis mode at intervals that are determined by the set value stored in the memory unit. The hardware self-diagnosis unit performs the hardware self-diagnosis in the simplified diagnosis mode in between the intervals of the detailed diagnosis mode.

According to another aspect of the present invention, a hardware self-diagnosing method for performing a hardware self-diagnosis of an image forming apparatus includes the steps of reading a set value stored in a memory unit of the image forming apparatus; performing the hardware self-diagnosis of the image forming apparatus in a detailed diagnosis mode at intervals determined by the set value stored in the memory unit; and performing the hardware self-diagnosis of the image forming apparatus in a simplified diagnosis mode in between the intervals at which the hardware self-diagnosis is performed in the detailed diagnosis mode.

According to yet another aspect, a computer-readable hardware self-diagnosing program which, when executed by one or more processors of an image forming apparatus, carries out the steps of reading a set value stored in a memory unit of the image forming apparatus; performing the hardware self-diagnosis of the image forming apparatus in a detailed diagnosis mode at intervals determined by the set value stored in the memory unit; and performing the hardware self-diagnosis of the image forming apparatus in a simplified diagnosis mode in between the intervals at which the hardware self-diagnosis is performed in the detailed diagnosis mode.

BRIEF DESCRIPTION OF THE DRAWINGS

These and other objects, features and advantages of the invention will be apparent to those skilled in the art from the following detailed description of the invention, when read in conjunction with the accompanying drawings in which.

DETAILED DESCRIPTION OF THE PREFERRED EMBODIMENTS

In the following, embodiments of the present invention are described with reference to the drawings.

Figure 1:
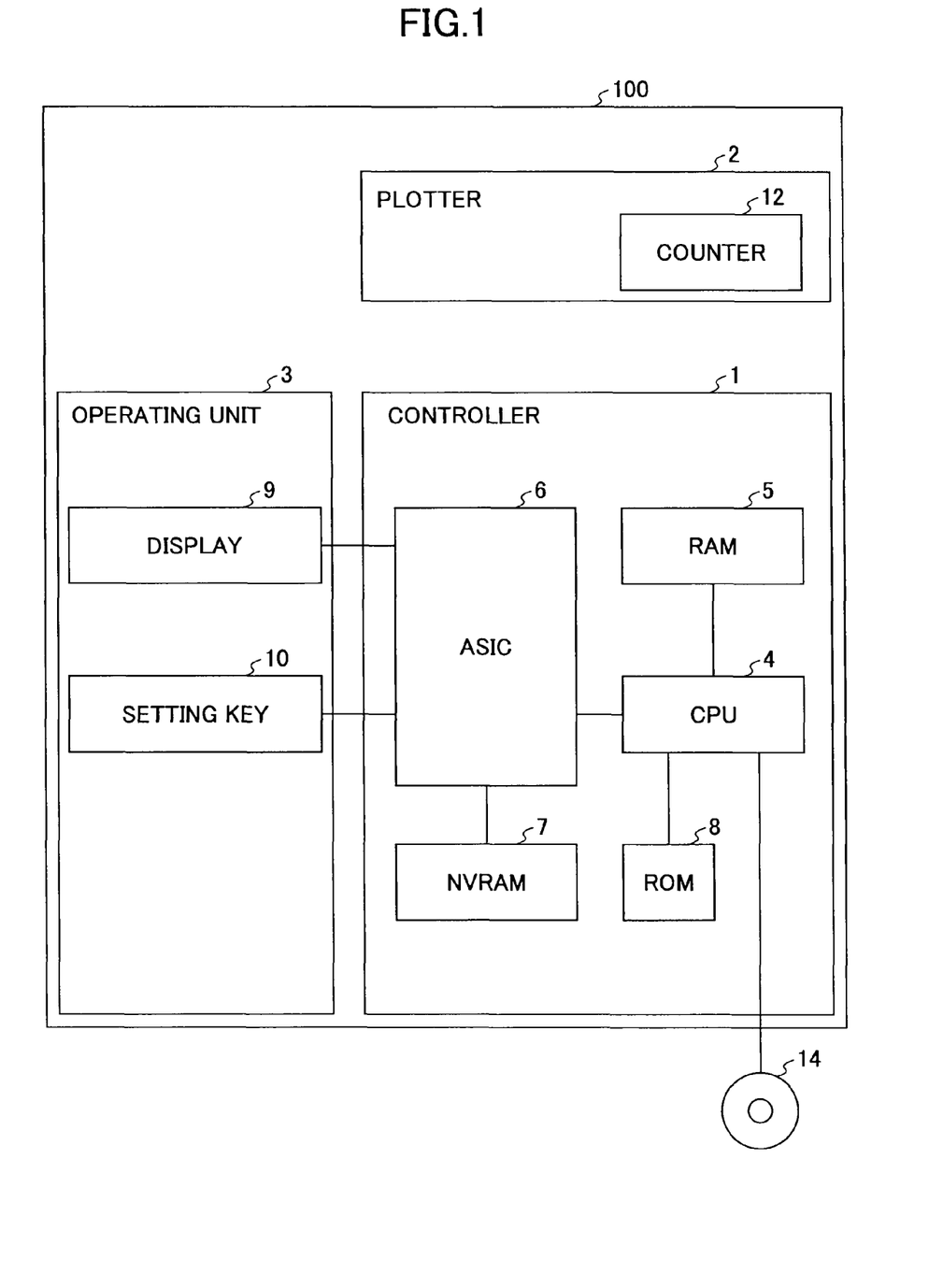
FIG. 1 shows a block diagram of an image forming apparatus according to an embodiment of the present invention.

FIG. 1 shows a block diagram of an image forming apparatus 100 according to an embodiment of the present invention. The image forming apparatus 100 includes a controller unit 1, a plotter unit 2, and an operating unit 3. The controller unit 1 includes a central processing unit (CPU) 4, a random access memory (RAM) 5, an application specific integrated circuit (ASIC) 6, a non-volatile random access memory (NVRAM) 7, and a read-only memory (ROM) 8.

The plotter unit 2 is configured to print information on a recording medium, such as a sheet of paper. The operating unit 3 includes a display 9 for displaying information to a user, and a setting key 10 operated by the user.

The CPU 4 controls the various functions of the controller unit 1 in accordance with a control program stored in the ROM 8. The RAM 5 provides a memory for the storage of various input data and a working area for the CPU 4. The ASIC 6 is a circuit on which required control circuits are implemented. The NVRAM 7 may be used to store a setting concerning a predetermined timer setting period entered via the setting key 10. The ROM 8 provides a memory that may be used for storing the control program and image information necessary for the display of information on the display 9. The CPU 4 may read the control program or the like from an external recording medium 14.

The display 9 displays information about the image forming apparatus 100 to the user based on information stored in the ROM 8. The setting key 10 is used by the user to enter various settings.

The controller unit 1 has two self-diagnosis modes; namely, a simplified diagnosis mode and a detailed diagnosis mode. In the simplified diagnosis mode, a simplified diagnose is performed whereby device connection alone can be checked. In the detailed diagnosis mode, a detailed diagnosis is performed whereby device operation can be checked. In a case of a memory diagnosis, the simplified diagnosis may only involve checking the connection of the memory (to a pattern on a substrate, for example). For example, when there are 10 memory address bits and 8 data bits, data AA (Hex) and 55 (Hex) may be written at address 155 (Hex) and checked to see if the data is readable, and data 55 (Hex) and AA (Hex) may be written at address 2 AA (Hex) and checked to see if it is readable. On the other hand, in the detailed diagnosis mode, data AA (Hex) and 55 (Hex) may be written at all of the addresses and then read out to check that the RAM 5 operates normally. These are merely examples and the simplified diagnosis and the detailed diagnosis may be modified in various other ways to be applied to various diagnostic methods.

Embodiment 1

Figure 2:
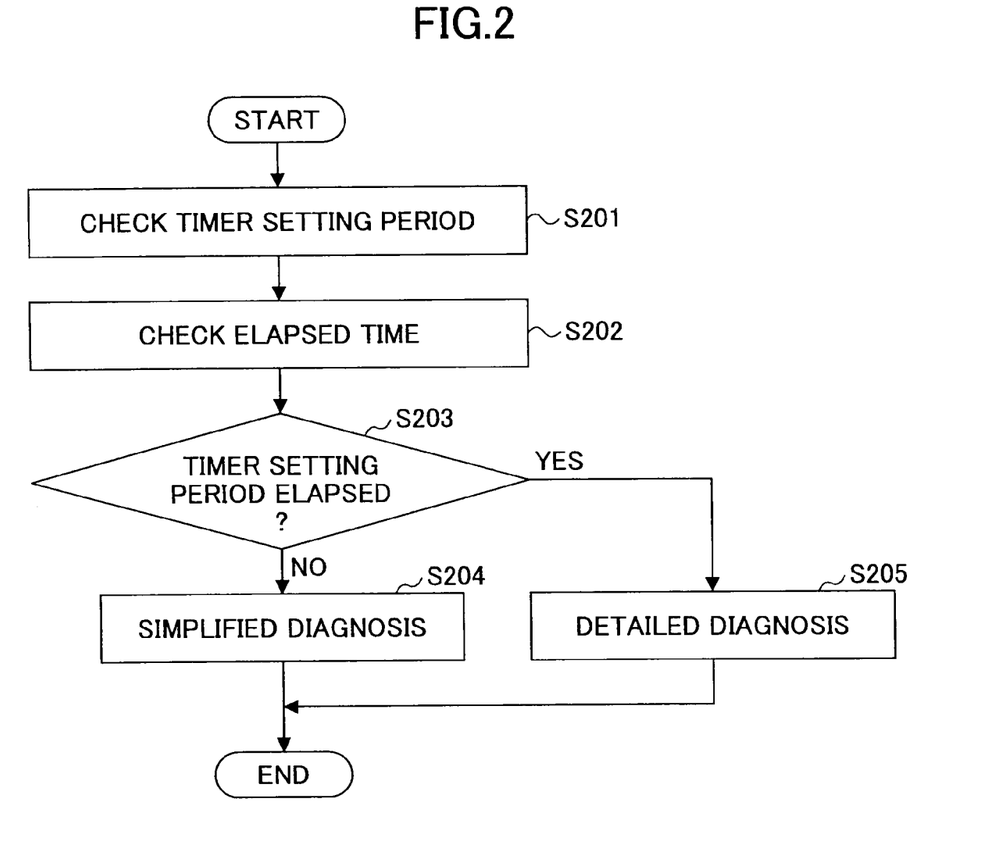
FIG. 2 shows a flowchart of a hardware self-diagnosing process performed by a controller unit of the image forming apparatus according to the embodiment of FIG. 1.

FIG. 2 shows a flowchart of a hardware self-diagnosing process performed by the controller unit 1.

The controller unit 1 checks a preset timer setting period upon turning-on of main power to the image forming apparatus 100 (step S201). The controller unit 1 then checks an elapsed time (step S202), and determines whether the timer setting period has elapsed (step S203). If the timer setting period has not elapsed (NO in step S203), the controller unit 1 selects the simplified diagnosis mode and performs the simplified hardware diagnosis (step S204). On the other hand, if the timer setting period has elapsed (YES in step S203), the controller unit 1 selects the detailed diagnosis mode and performs the detailed hardware diagnosis (step S205).

Thus, the controller unit 1 performs the detailed hardware diagnosis whenever the timer setting period recorded in the NVRAM 7, which is a nonvolatile memory, has elapsed at the time of turning on the main power to the image forming apparatus 100. After the detailed diagnosis is performed, the simplified hardware diagnosis is implemented upon turning on of main power until the time set in the timer elapses.

Thus the present embodiment has the simplified diagnosis mode and the detailed diagnosis mode so that, using the timer function of the image forming apparatus, the detailed diagnosis can be implemented only after a timer setting period elapses. Therefore, the startup time before the image forming apparatus becomes operable following the turning on of power can be reduced.

Embodiment 2

Figure 3:
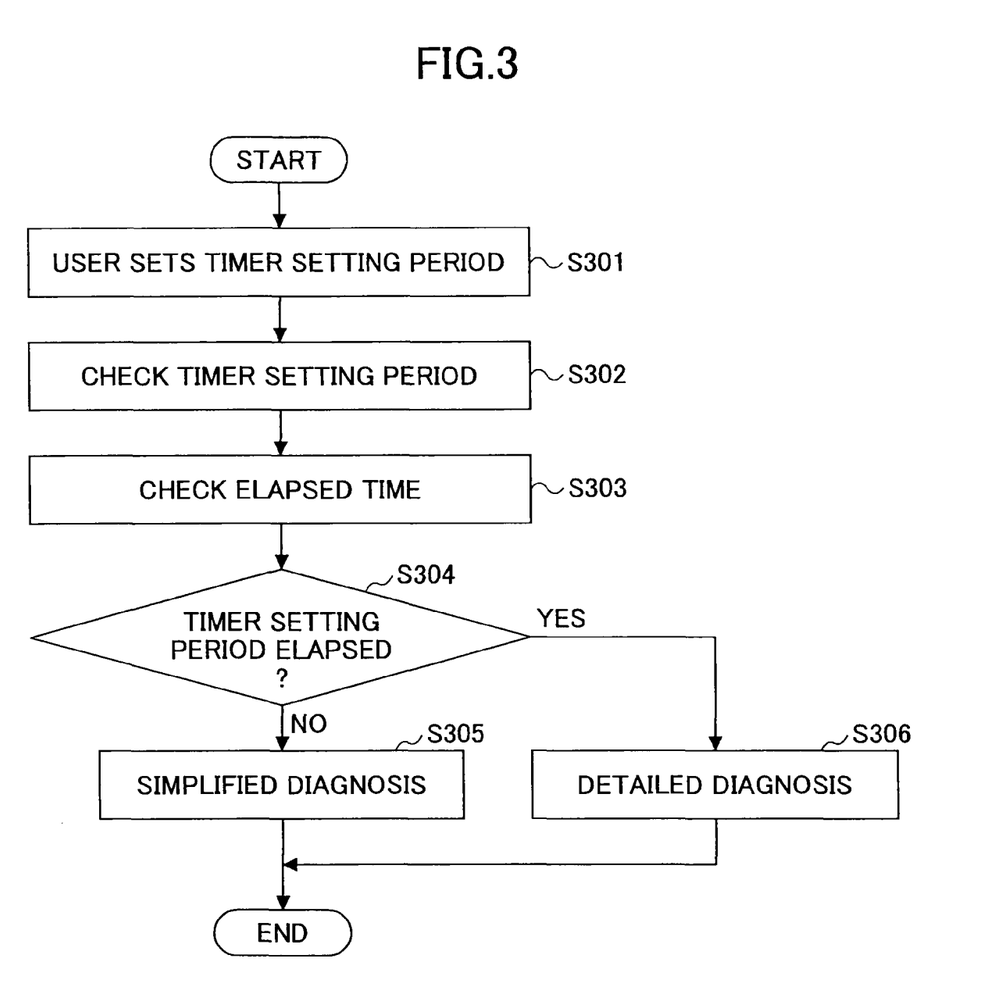
FIG. 3 shows a flowchart of a hardware self-diagnosing process performed by the controller unit based on a timer setting period set by a user.

FIG. 3 shows a flowchart of a hardware self-diagnosing process performed by the controller unit 1 based on a timer setting period set by the user in the image forming apparatus 100 according to a second embodiment.

The user sets a desired timer setting period in the NVRAM 7 using the setting key 10 (step S301). When the main power to the image forming apparatus 100 is turned on, the controller unit 1 checks the timer setting period set by the user (step S302).

The controller unit 1 then checks the elapsed time (step S303) to determine whether the timer setting period set by the user has elapsed (step S304). If the timer setting period set by the user has not elapsed (NO in step S304), the controller unit 1 selects the simplified diagnosis mode to perform the simplified hardware diagnosis (step S305). If the timer setting period set by the user has elapsed (YES in step S304), the controller unit 1 selects the detailed diagnosis mode and performs the detailed hardware diagnosis (step S306).

Thus, the controller unit 1 implements the detailed hardware diagnosis whenever the timer setting value recorded in the NVRAM 7 by the user has elapsed at the time of turning on the main power to the image forming apparatus 100. After the detailed diagnosis is performed, the simplified hardware diagnosis is implemented upon turning on of main power until the time set in the timer elapses.

Thus, the startup time can be reduced as in Embodiment 1. In addition, in accordance with Embodiment 2, the period of implementation of the detailed diagnosis can be designated by the user. Accordingly, the user can choose to either improve reliability by shortening the detailed diagnosis period, thereby perform the detailed diagnosis more frequently, or to reduce the number of times of implementation of the detailed diagnosis to give priority to decreasing the startup time.

Embodiment 3

Figure 4:
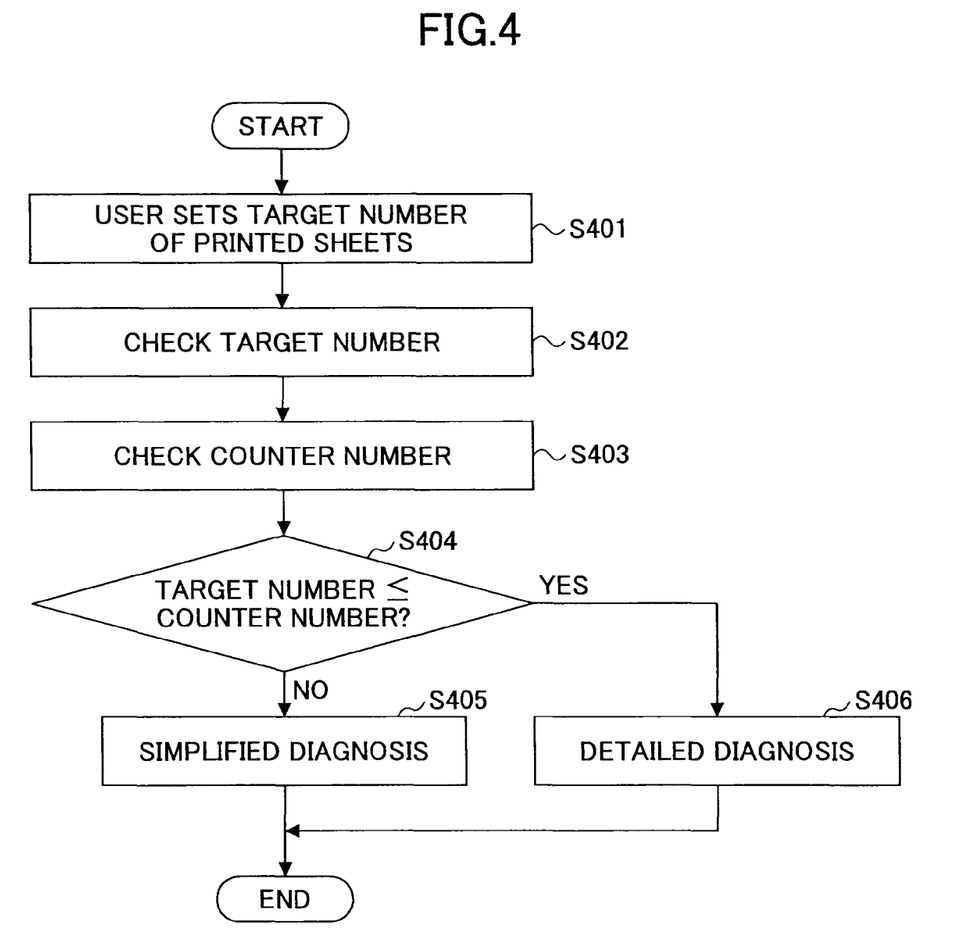
FIG. 4 shows a flowchart of a hardware self-diagnosing process performed by the controller unit based on a number of printed sheets outputted by a plotter unit of the image forming apparatus.

FIG. 4 shows a flowchart of the hardware self-diagnosis performed by the controller unit 1 based on the number of printed sheets outputted by the plotter unit 2 of the image forming apparatus 100 according to Embodiment 3.

First, the user sets, via a user-operable unit such as the setting key 10, a target number of printed sheets for the detailed diagnosis in the NVRAM 7 (step S401). Upon turning on of the main power to the image forming apparatus 100, the controller unit 1 checks the target number of sheets (step S402).

The controller unit 1 then checks the number of printed sheets counted by the counter 12, which counts the number of printed sheets outputted by the plotter unit 2 (step S403), and determines whether the target number of printed sheets is reached (step S404). If the target number of printed sheets is not reached (NO in step S404), the controller unit 1 selects the simplified diagnosis mode and implements the simplified hardware diagnosis (step S405). If the target number of printed sheets is reached (YES in step S404), the controller unit 1 selects the detailed diagnosis mode and performs the detailed hardware diagnosis (step S406).

Thus the detailed hardware diagnosis is implemented each time the counter value indicating the number of printed sheets reaches the predetermined target number of sheets recorded in the NVRAM 7 by the user. After the detailed diagnosis is performed, the simplified hardware diagnosis is implemented upon turning on of main power until the target number of sheets is reached.

Thus, in accordance with the present embodiment, the implementation period for the detailed diagnosis is based on the number of sheets outputted by the plotter unit 2, so that the detailed diagnosis is implemented more frequently as the frequency of use of the image forming apparatus increases. Generally, failure tends to develop more frequently as the frequency of use of an image forming apparatus increases. Accordingly, the frequency of the detailed diagnosis, which is capable of failure detection, can be adjusted depending on the frequency of use of the image forming apparatus.

In this way, improved reliability can be obtained over the above-described Embodiments 1 and 2. When the frequency of use is low, there is less need for the detailed diagnosis; thus, by implementing the simplified diagnosis, the startup time before the image forming apparatus becomes available following the turning on of power supply can be reduced.

Embodiment 4

Figure 5:
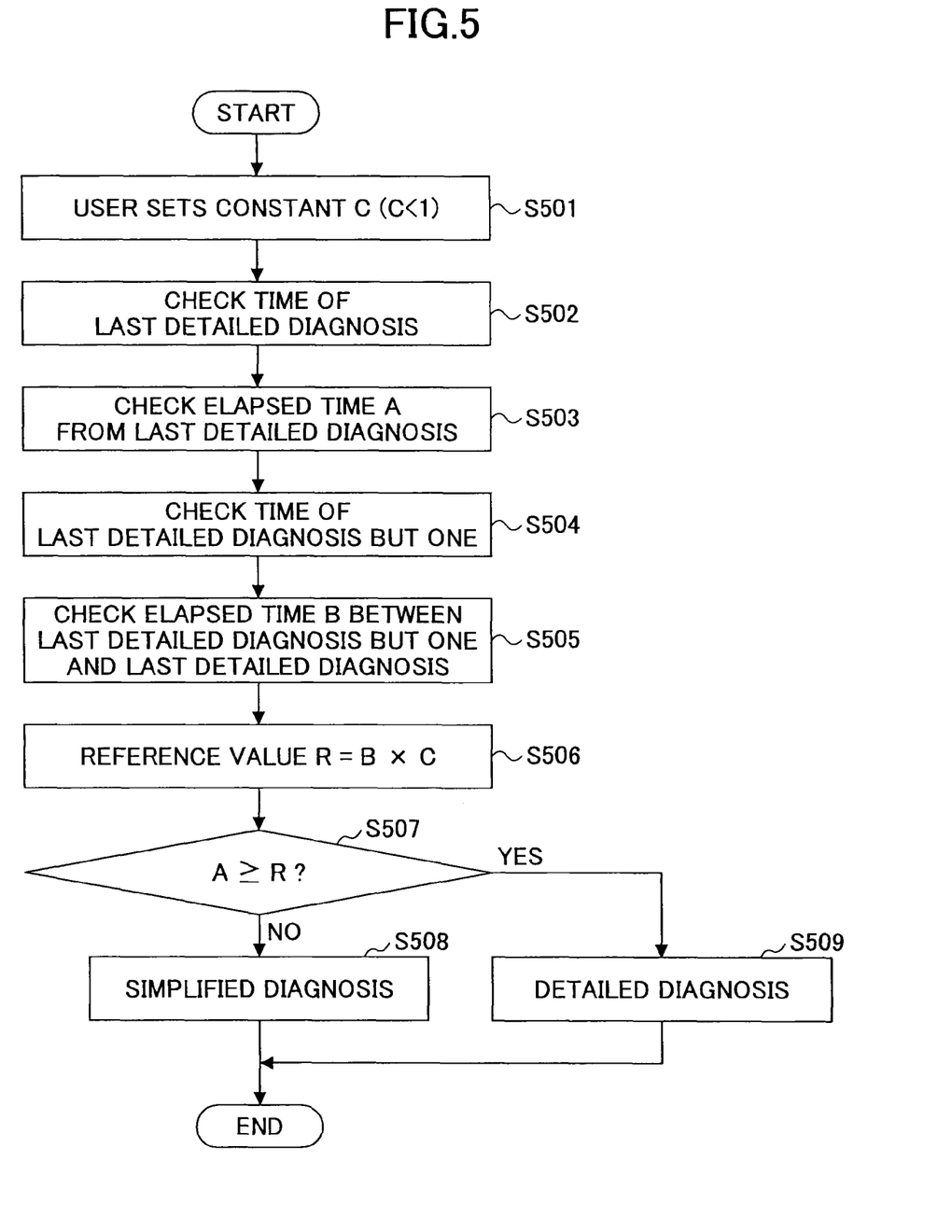
FIG. 5 shows a flowchart of a process in which an interval for implementing a detailed diagnosis is varied depending on the age of the image forming apparatus.

FIG. 5 shows a flowchart of a process according to Embodiment 4 in which the interval of implementation of the detailed diagnosis is varied depending on the age of the image forming apparatus 100.

A user first sets a desired constant value C (C<1) in the NVRAM 7, using a user-operable unit such as the setting key 10 (step S501). Upon turning on of main power to the image forming apparatus, the controller unit 1 determines when the detailed diagnosis was implemented last (step S502), and checks an elapsed time A since the last detailed diagnosis (step S503). The controller unit 1 then determines when the last detailed diagnosis but one was implemented (step S504), and checks an elapsed time B between the last detailed diagnosis but one and the last detailed diagnosis (step S505).

The elapsed time B is multiplied by the constant C to obtain a reference value R (step S506). The reference value R is then compared with the elapsed time A since the last detailed diagnosis checked in step S502 (step S507). If the time A since the last detailed diagnosis is less than the reference value R (NO in step S507), the controller unit 1 selects the simplified diagnosis mode and performs the simplified hardware diagnosis (step S506\8). If the time A since the last detailed diagnosis is equal to or greater than the reference value R (YES in step S507), the controller unit 1 selects the detailed diagnosis mode and performs the detailed hardware diagnosis (step S509).

Thus, the period of implementation of the detailed diagnosis is set depending on the reference value R obtained by multiplying the constant C (C<1) recorded in the NVRAM 7 by the user with the elapsed time B between the last detailed diagnosis but one and the last detailed diagnosis. Accordingly, the detailed diagnosis is implemented more frequently as the image forming apparatus ages.

Thus in accordance with Embodiment 4, the implementation period of the detailed diagnosis is set to be inversely proportional to the age of the image forming apparatus. Because an older image forming apparatus can be expected to produce failures more often, by increasing the frequency of the detailed diagnosis capable of failure detection as the apparatus is used longer, improved reliability can be obtained over Embodiments 1 and 2.

Embodiment 5

Figure 6:
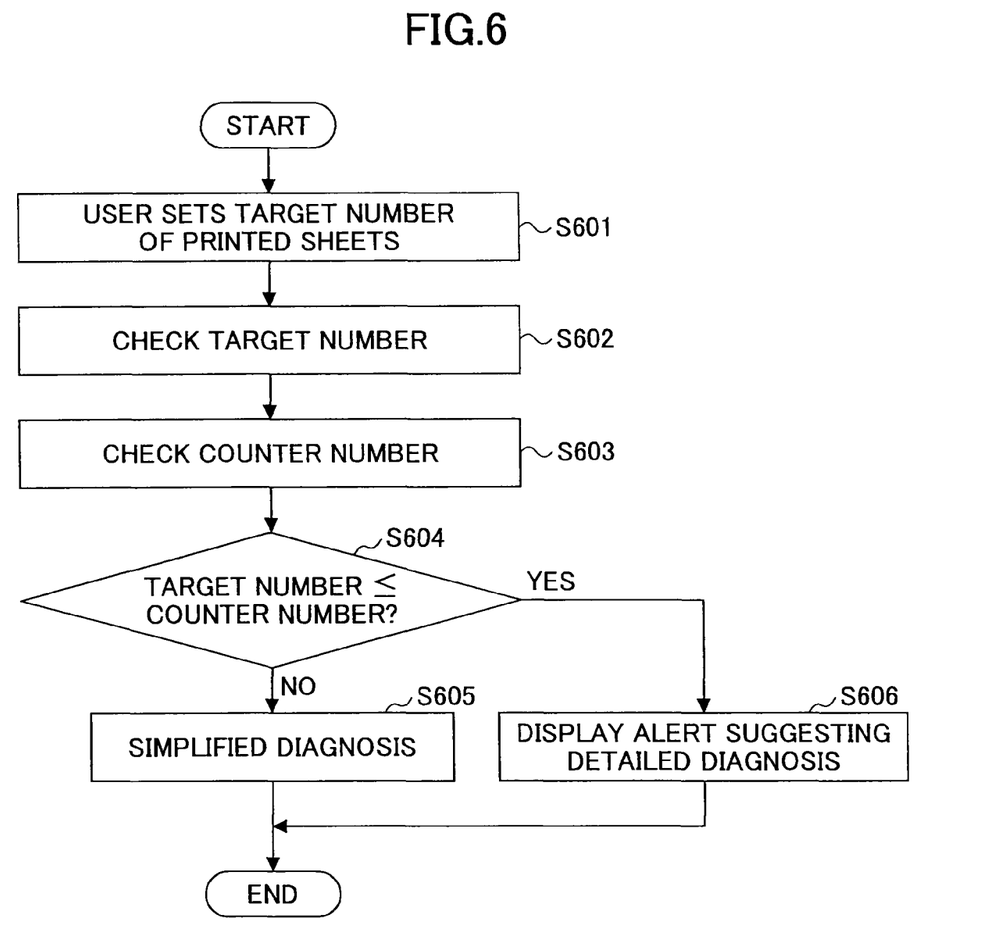
FIG. 6 shows a flowchart of a process in which an alert prompting the user to implement the detailed diagnosis is displayed on a display based on the number of printed sheets outputted by the plotter unit.

FIG. 6 shows a flowchart of a process according to Embodiment 5 in which an alert is displayed on the display 9 prompting a user to implement the detailed diagnosis, based on the number of sheets outputted by the plotter unit 2 of the image forming apparatus 100.

The user, using a user-operable unit such as the setting key 10, first sets a target number of printed sheets in the NVRAM 7 for displaying the alert prompting the user to implement the detailed diagnosis (step S601). When the main power to the image forming apparatus 100 is turned on, the controller unit 1 checks the target number of printed sheets set by the user (step S602). The controller unit 1 then checks the number of printed sheets outputted by the plotter unit 2 that is counted by the counter 12 (step S603), and determines whether the user-set number of printed sheets is reached (step S604). If the target number of printed sheets is not reached (NO in step S604), the controller unit 1 selects the simplified diagnosis mode and implements the simplified hardware diagnosis (step S605). If the target number of printed sheets is reached (YES in step S604), the alert prompting the user to implement the detailed diagnosis is displayed on the display 9 (step S606).

Thus, as opposed to the above-described Embodiment 3, the detailed hardware diagnosis is not implemented even when the target number of printed sheets is reached. Instead, the user is prompted to implement the detailed diagnosis via the display 9. Namely, priority is given to reducing the startup time by performing the simplified diagnosis, while the user is notified of a need for the detailed diagnosis in order to ensure reliability.

Thus in accordance with the present embodiment, the alert is displayed more frequently as the frequency of use of the image forming apparatus increases. Further, the user can dispense with the detailed diagnosis when he or she wishes to start up the image forming apparatus fast, while being informed of the detailed diagnosis implementation period.

Embodiment 6

Figure 7:
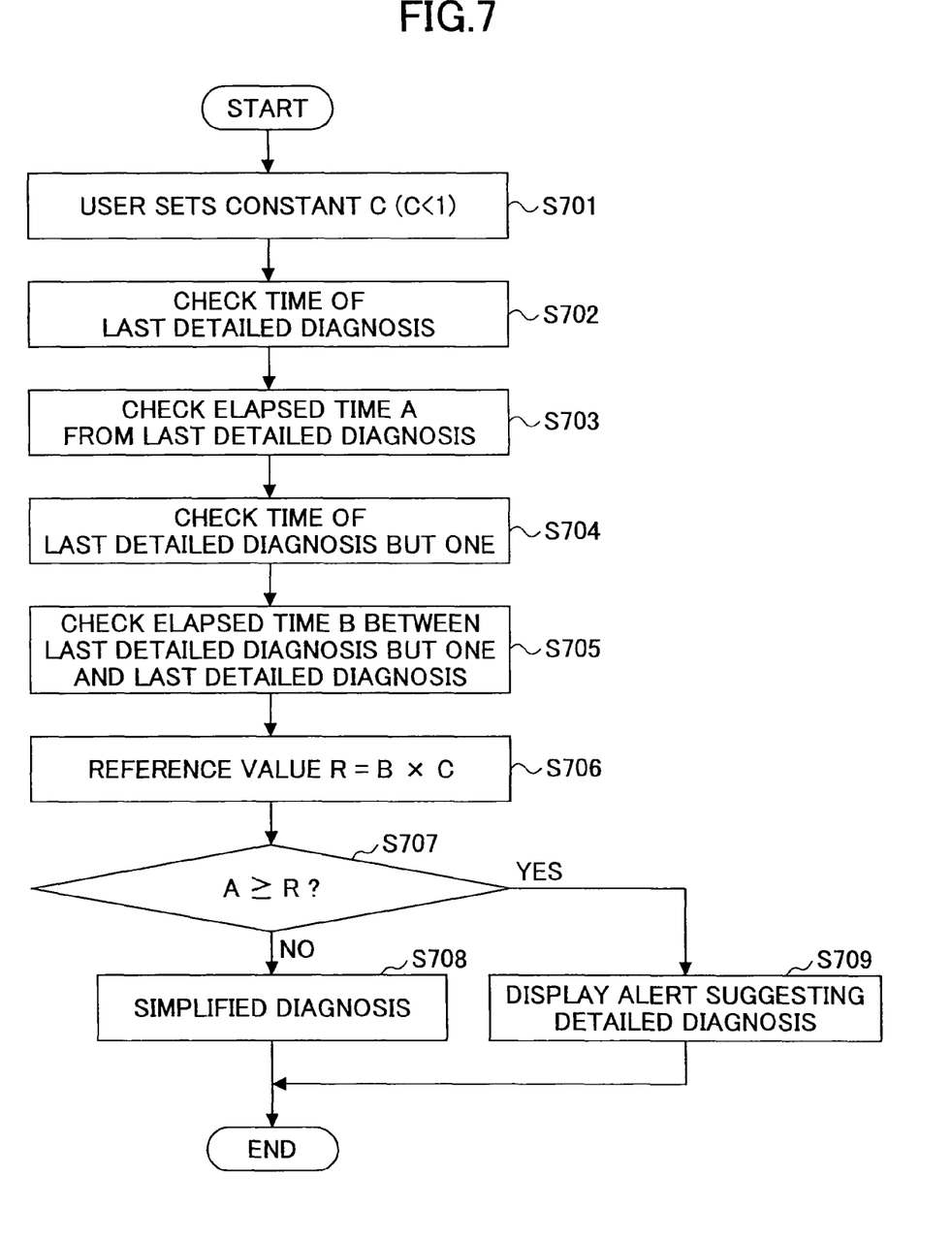
FIG. 7 shows a flowchart of a process in which the alert prompting the user to implement the detailed diagnosis is displayed on the display based on the age of the image forming apparatus.

FIG. 7 shows a flowchart of a process of displaying the aforementioned alert on the display 9 based on the age of the image forming apparatus 100.

A user initially sets a desired constant value C smaller than one in the NVRAM 7 using a user-operable unit, such as the setting key 10 (step S701). The controller unit 1, upon turning on of main power to the image forming apparatus, determines when the detailed diagnosis was implemented last (step S702), and checks an elapsed time A since the last detailed diagnosis (step S703). The controller unit 1 then determines when the last detailed diagnosis but one was implemented (step S704), and checks an elapsed time B between the last detailed diagnosis but one and the last detailed diagnosis (step S705).

Then, the elapsed time B is multiplied by the constant C, obtaining a reference value R (step S706). The reference value R is then compared with the elapsed time A since the last detailed diagnosis (step S707). If the time A is less than the reference value R (NO in step S7057), the controller unit 1 selects the simplified diagnosis mode and performs the simplified hardware diagnosis (step S708). If the time A since the last detailed diagnosis is equal to or greater than the reference value R (YES in step S707), the alert prompting the user to implement the detailed diagnosis is displayed on the display 9 (step S709).

Thus the period for displaying the alert prompting the user to implement the detailed diagnosis on the display 9 is set with reference to the reference value obtained by multiplying the constant C (C<1) recorded in the NVRAM 7 by the elapsed time B between the last detailed diagnosis but one and the last detailed diagnosis. As opposed to the above-described Embodiment 4, the detailed hardware diagnosis is not implemented even when the time A since the last detailed diagnosis is equal to or greater than the reference value R, while the alert prompting the user to implement the detailed diagnosis is displayed on the display 9. Namely, priority is given to reducing the startup time by implementing the simplified diagnosis, while the user is notified about the need for the detailed diagnosis in order to ensure reliability.

In accordance with the present embodiment, because the detailed diagnosis implementation period is set to be inversely proportional to the age of the image forming apparatus, the detailed-diagnosis-prompting alert is displayed on the display 9 more frequently as the image forming apparatus is used longer. Further, the user can dispense with the detailed diagnosis when he or she wishes to start up the image forming apparatus fast while being notified of the detailed diagnosis implementation period.

Embodiment 7

In the present embodiment, which may be based on any of the foregoing Embodiments 1 through 6, the detailed diagnosis mode is turned off by a user input via the operating unit 3, so that the startup time of the image forming apparatus 100 can be reduced at all times.

Any or all of the foregoing processes described above with reference to the flowcharts in the drawings may be described in a program to be executed by the CPU 4. Such a program may be recorded in a computer-readable recording medium, such as a semiconductor storage unit or an optical and/or magnetic storage unit. Such programs or recording media may be used in a system that may differ from the systems according to the foregoing embodiments and may be executed by a corresponding CPU, whereby substantially the same advantageous effects as those of the foregoing embodiments can be obtained.

Although this invention has been described in detail with reference to certain embodiments, variations and modifications exist within the scope and spirit of the invention as described and defined in the following claims.

The present application is based on the Japanese Priority Application No. 2008-048779 filed Feb. 28, 2008, the entire contents of which are hereby incorporated by reference.

What is claimed is:

1. An image forming apparatus comprising:
a hardware self-diagnosing unit having a simplified diagnosis mode and a detailed diagnosis mode and being configured to perform a hardware self-diagnosis of the image forming apparatus; and
a memory unit configured to store a set value for implementing the hardware self-diagnosis in the detailed diagnosis mode,
wherein the hardware self-diagnosis unit performs the hardware self-diagnosis in the detailed diagnosis mode at intervals that are determined by the set value stored in the memory unit,
wherein the hardware self-diagnosis unit performs the hardware self-diagnosis in the simplified diagnosis mode in between the intervals of the detailed diagnosis mode.

2. The image forming apparatus according to claim 1, further comprising an operating unit, wherein the set value stored in the memory unit is selected by a user of the image forming apparatus using the operating unit.

3. The image forming apparatus according to claim 1, further comprising a timer unit configured to measure a period of time of use of the image forming apparatus,
wherein the set value stored in the memory unit includes a target period of time, and
wherein the hardware self-diagnosis unit performs the hardware self-diagnosis in the detailed diagnosis mode when the period of time of use of the image forming apparatus measured by the timer unit reaches the target period of time.

4. The image forming apparatus according to claim 1, further comprising:
a data processing unit configured to process data;
a printing unit configured to print the data processed by the data processing unit on a recording medium; and
a counting unit configured to count a number of the recording media printed by the printing unit,
wherein the set value stored in the memory unit includes a target number of the recording media, and
wherein the hardware self-diagnosis unit performs the hardware self-diagnosis in the detailed diagnosis mode when the number of the recording media counted by the counting unit reaches the target number of the recording media.

5. The image forming apparatus according to claim 1, wherein the intervals of time at which the hardware self-diagnosis is performed in the detailed diagnosis mode are varied inversely proportionally to an age of the image forming apparatus.

6. The image forming apparatus according to claim 1, further comprising a display unit and a timer unit configured to measure a period of time of use of the image forming apparatus,
wherein the set value stored in the memory unit includes a target period of time, and
wherein the display unit displays an alert prompting the user to perform the hardware self-diagnosis in the detailed diagnosis mode when the period of time of use of the image forming apparatus measured by the timer unit reaches the target period of time.

7. The image forming apparatus according to claim 1, further comprising:
a data processing unit configured to process data;
a printing unit configured to print the data processed by the data processing unit on a recording medium;
a display unit; and a counting unit configured to count a number of the recording media printed by the printing unit,
wherein the set value stored in the memory unit includes a target number of the recording media, and
wherein the display unit displays an alert prompting the user to perform the hardware self-diagnosis in the detailed diagnosis mode when the number of the recording media counted by the counting unit reaches the target number of the recording media.

8. The image forming apparatus according to claim 2, further comprising a detailed diagnosis deactivating unit configured to deactivate the detailed diagnosis mode in response to an instruction entered by the user via the operating unit.

9. A hardware self-diagnosing method for performing a hardware self-diagnosis of an image forming apparatus, the method comprising the steps of:
reading a set value stored in a memory unit of the image forming apparatus;
performing the hardware self-diagnosis of the image forming apparatus in a detailed diagnosis mode at intervals determined by the set value stored in the memory unit; and
performing the hardware self-diagnosis of the image forming apparatus in a simplified diagnosis mode in between the intervals at which the hardware self-diagnosis is performed in the detailed diagnosis mode.

10. The hardware self-diagnosing method according to claim 9, wherein the image forming apparatus including a timer unit, the method further comprising a step of measuring a period of time of use of the image forming apparatus using the timer unit,
wherein the set value stored in the memory unit of the image forming apparatus includes a target period of time, and
wherein the hardware self-diagnosis is performed in the detailed diagnosis mode when the period of time of use of the image forming apparatus measured in the measuring step reaches the target period of time.

11. The hardware self-diagnosing method according to claim 9, wherein the image forming apparatus includes a printing unit and a counting unit, the method further comprising the steps of:
processing data in the image forming apparatus;
printing the data on a recording medium using the printing unit; and
counting a number of the recording media printed in the printing step using the counting unit,
wherein the set value stored in the memory unit of the image forming apparatus includes a target number of the recording media, and
wherein the hardware self-diagnosis is performed in the detailed diagnosis mode when the number of the recording media counted in the counting step reaches the target number of the recording media.

12. The hardware self-diagnosing method according to claim 9, wherein the image forming apparatus further includes a display unit and a timer unit, the method further comprising a step of measuring a period of time of use of the image forming apparatus using the timer unit,
wherein the set value stored in the memory unit of the image forming apparatus includes a target period of time,
the method comprising a step of displaying an alert on the display unit when the period of time of use of the image forming apparatus measured in the measuring step reaches the target period of time.

13. The hardware self-diagnosing method according to claim 9, wherein the image forming apparatus includes a display unit, a printing unit, and a counting unit, the method further comprising the steps of:
processing data in the image forming apparatus;
printing the data on a recording medium using the printing unit; and
counting a number of the recording media printed in the printing step using the counting unit,
wherein the set value stored in the memory unit of the image forming apparatus includes a target number of the recording media,
the method further comprising a step of displaying an alert on the display unit when the number of the recording media counted in the counting step reaches the target number of the recording media.

14. The hardware self-diagnosing method according to claim 9, comprising a step of varying the intervals at which the hardware self-diagnosis is performed in the detailed diagnosis mode inversely proportionally to an age of the image forming apparatus.

15. A non-transitory computer-readable medium storing a hardware self-diagnosing program which, when executed by one or more processors of an image forming apparatus, carries out the steps of:
reading a set value stored in a memory unit of the image forming apparatus;
performing the hardware self-diagnosis of the image forming apparatus in a detailed diagnosis mode at intervals determined by the set value stored in the memory unit; and
performing the hardware self-diagnosis of the image forming apparatus in a simplified diagnosis mode in between the intervals at which the hardware self-diagnosis is performed in the detailed diagnosis mode.

16. The non-transitory computer-readable medium according to claim 15, wherein the image forming apparatus includes a timer unit, the program further carrying out a step of measuring a period of time of use of the image forming apparatus using the timer unit,
wherein the set value stored in the memory unit of the image forming apparatus includes a target period of time,
wherein the hardware self-diagnosis is performed in the detailed diagnosis mode when the period of time of use of the image forming apparatus measured in the measuring step reaches the target period of time.

17. The non-transitory computer-readable medium according to claim 15, wherein the image forming apparatus includes a data processing unit, a counting unit, and a printing unit, the program further carrying out the steps of:
processing data using the data processing unit;
printing the data processed in the processing step on a recording medium using the printing unit; and
counting a number of the recording media printed in the printing step using the counting unit,
wherein the set value stored in the memory unit of the image forming apparatus includes a target number of the recording media, and
wherein the hardware self-diagnosis is performed in the detailed diagnosis mode when the number of the recording media counted in the counting step reaches the target number of the recording media.

18. The non-transitory computer-readable medium according to claim 15, wherein the image forming apparatus includes a display unit and a timer unit, the program carrying out a step of measuring a period of time of use of the image forming apparatus using the timer unit, wherein the set value stored in the memory unit of the image forming apparatus includes a target period of time, the program further carrying out a step of displaying an alert on the display unit when the period of time of use of the image forming apparatus measured in the measuring step reaches the target period of time.

19. The non-transitory computer-readable medium according to claim 15, wherein the image forming apparatus includes a data processing unit, a display unit, a printing unit, and a counting unit, the program further carrying out the steps of:

processing data using the data processing unit;

printing the data processed in the processing step on a recording medium using the printing unit; and counting a number of the recording media printed in the printing step using the counting unit, wherein the set value stored in the memory unit of the image forming apparatus includes a target number of the recording media, the program further carrying out a step of displaying an alert on the display unit when the number of the recording media counted in the counting step reaches the target number of the recording media.

20. The non-transitory computer-readable medium according to claim 15, the program further carrying out a step of varying the intervals at which the hardware self-diagnosis is performed in the detailed diagnosis mode inversely proportionally to an age of the image forming apparatus.

* * * * *